United States Patent [19]
Ishida et al.

[11] Patent Number: 5,930,225
[45] Date of Patent: Jul. 27, 1999

[54] TWO-LAYER OPTICAL DISK

[75] Inventors: Takashi Ishida, Yawata; Mamoru Shoji, Takatsuki; Shunji Ohara, Higashiosaka; Shinichi Konishi, Hirakata; Yoshito Aoki, Moriguchi; Yoshiyuki Miyabata; Yuji Hisakado, both of Osaka; Hironori Deguchi, Kadoma, all of Japan

[73] Assignee: Matsushita Electric Industrial Co., Ltd., Osaka, Japan

[21] Appl. No.: 08/955,152

[22] Filed: Oct. 21, 1997

Related U.S. Application Data

[62] Division of application No. 08/666,945, Jun. 20, 1996, Pat. No. 5,729,525.

[30] Foreign Application Priority Data

Jun. 21, 1995 [JP] Japan .................................. 7-154306

[51] Int. Cl.$^6$ .................................................. G11B 7/24
[52] U.S. Cl. .................... 369/275.1; 369/94; 369/275.3
[58] Field of Search ................................ 369/275.1, 94, 369/275.3, 281, 283, 286; 386/126

[56] References Cited

U.S. PATENT DOCUMENTS

| | | |
|---|---|---|
| 3,855,426 | 12/1974 | Bouwhuis . |
| 4,126,726 | 11/1978 | Soeding . |
| 4,450,553 | 5/1984 | Holster et al. ........................ 369/275.1 |
| 5,303,225 | 4/1994 | Satoh et al. .......................... 369/275.3 |
| 5,408,453 | 4/1995 | Holtsag et al. . |
| 5,428,597 | 6/1995 | Satoh et al. . |
| 5,470,627 | 11/1995 | Lee et al. . |
| 5,592,462 | 1/1997 | Beldock et al. . |
| 5,598,398 | 1/1997 | Best et al. . |
| 5,757,744 | 5/1998 | Akkermans ............................... 369/94 |

*Primary Examiner*—Tan Dinh
*Attorney, Agent, or Firm*—Greenblum & Bernstein, P.L.C.

[57] ABSTRACT

A two-layer optical disk has a first layer of a disk shaped recording medium for storing data and a second layer of a disk shaped recording medium placed over the first layer for storing data. Data blocks A, B, C are stored in the first layer in said order. Similarly, data blocks X, Y, Z are stored in the second layer in said order. When reading the data from the two-layer optical disk, the data blocks are read in the order of A, X, B, Y, C, Z.

15 Claims, 11 Drawing Sheets

TWO-LAYER OPTICAL DISK

This application is a division of application Ser. No. 08/666,945, filed Jun. 20, 1996, and now is U.S. Pat. No. 5,729,525.

BACKGROUND OF THE INVENTION

1. Field of the Invention

The present invention relates to a two-layer optical disk having two recording layers to which information is recorded, and enabling information on both recording layers to be reproduced by irradiating the disk with light from only one recording layer side.

2. Description of the Prior Art

Optical disks having two data recording layers ("two-layer optical disks" below) from which data can be reproduced by irradiating the disk with light from one side of the disk have been developed and described in U.S. Pat. No. 5,428,597.

The structure of a two-layer optical disk is shown in FIG. 11. As shown in FIG. 11, this two-layer optical disk comprises a first recording layer 1102 and a second recording layer 1104 disposed between a bottom resin base 1101 and a top resin base 1105 with a resin bonding layer 1103 disposed between the two recording layers. Data bits 1126 are recorded to the first and second recording layers in spiral or concentric recording tracks. Note that the data bits 1126 may be formed as physical pits and lands, or as amorphous bits. Note also that the first recording layer 1102 is semi-transparent.

When reading this two-layer optical disk, light is emitted to the disk from only one side thereof, i.e., the side to which the resin base 1101 is disposed in this example. The data recorded to the first recording layer 1102 can thus be read by focusing the emitted light on the first recording layer 1102. Because the first recording layer 1102 is transparent, data on the second recording layer 1104 can be read by focusing the light on the second recording layer 1104 through the first recording layer 1102.

Applications for a two-layer optical disk include using both first and second recording layers to record movies and other types of extended, continuous information, and using the first recording layer to record first information (such as a directory) and the second recording layer to record plural data referenced by the first information.

There has been proposed no system or method for sequentially recording and reading the data on the two-layer optical disk.

SUMMARY OF THE INVENTION

Therefore, the object of the present invention is to provide a unique method for recording and reading the data on the two-layer optical disk.

A further object of the present invention is to provide a two-layer optical disk requiring a minimal amount of memory to achieve seamless (uninterrupted) data reproduction.

A further object of the invention is to provide a two-layer optical disk whereby the seek time is minimized when referencing information.

A further object of the invention is to provide a two-layer optical disk whereby tracking can be maintained irrespective of where the focus jump (refocusing) occurs.

To achieve the aforementioned objects, a two-layer optical disk comprises: a first layer of a disk shaped recording medium for storing data; a second layer of a disk shaped recording medium placed over said first layer for storing data; a plurality of data blocks stored in said first layer; and a plurality of data blocks stored in said second layer, said data blocks in said first and second layers being alternately linked to present one stream of information.

According to the two-layer optical disk of the present invention, the data blocks in said first and second layers have different sizes.

According to the two-layer optical disk of the present invention, the data blocks in said first and second layers have a same size.

According to the two-layer optical disk of the present invention, the data blocks are sequentially aligned from the center of the layer to the peripheral of the layer, with the data blocks in the first layer taking odd numbered orders in the stream of information and the data blocks in the second layer taking even numbered orders in the stream of information.

According to the two-layer optical disk of the present invention, the data blocks are sequentially aligned from the peripheral of the layer to the center of the layer, with the data blocks in the first layer taking odd numbered orders in the stream of information and the data blocks in the second layer taking even numbered orders in the stream of information.

According to the two-layer optical disk of the present invention, the data blocks in the first layer are aligned contiguously and said data blocks in the second layer are aligned contiguously.

According to the two-layer optical disk of the present invention, the data blocks in the first layer are aligned contiguously and said data blocks in the second layer are aligned separately with a space between the blocks.

The two-layer optical disk of the present invention, further comprises dummy data filled in the second layer in areas other than the data blocks to make the total length of the data blocks in the second layer equal to that in the first layer.

The two-layer optical disk of the present invention, further comprises first dummy data filled in the first layer in areas other than the data blocks and second dummy data filled in the second layer in areas other than the data blocks to make the total length of the data blocks in the first layer equal to that in the second layer.

According to another embodiment of the present invention, a two-layer optical disk comprises: a first layer of a disk shaped recording medium for storing data; a second layer of a disk shaped recording medium placed over said first layer for storing data; a data block stored in said first layer, said data block having an interruption position; at least one auxiliary data block stored in said second layer, said data block in said first layer being interrupted during a reproduction at said interruption position so as to enable a selection between (i) insert said auxiliary data block from the second layer, and (ii) continue without any insertion.

According to the present invention, a method for reproducing a two-layer optical disk comprising: a first layer of a disk shaped recording medium for storing data; a second layer of a disk shaped recording medium placed over said first layer for storing data; a plurality of data blocks stored in said first layer; and a plurality of data blocks stored in said second layer, the method comprising the steps of:

(a) reading one block from said first layer;
(b) reading one block from said second layer;
(c) reading another block from said first layer; and
(d) reading another block from said second layer.

According to the method of the present invention, the one block and another block in said first layer are adjacent to each other with said one block located inner side of the first layer.

According to the method of the present invention, the one block and another block in said second layer are adjacent to each other with said one block located inner side of the second layer.

According to the method of the present invention, the one block and another block in said first layer are adjacent to each other with said one block located outer side of the first layer.

According to the method of the present invention, the one block and another block in said second layer are adjacent to each other with said one block located outer side of the second layer.

According to a further embodiment of the present invention, a method for reproducing a two-layer optical disk comprising: a first layer of a disk shaped recording medium for storing data; a second layer of a disk shaped recording medium placed over said first layer for storing data; a data block stored in said first layer, said data block having an interruption position; and at least one auxiliary data block stored in said second layer, said method comprising the steps of:

(a) reading said data block in said first layer up to said interruption position;

(b) selecting between (i) insert said auxiliary data block from the second layer at said interruption position, and (ii) continue without any insertion;

(c) when said (i) is selected, insert said auxiliary data block from the second layer at said interruption position, and thereafter continue reading the data block in said first layer from said interruption position; and (d) when said (ii) is selected, continue reading the data block without any insertion.

With a two-layer optical disk thus comprised, the data seek distance for data recorded across the first and second recording layers will always be less than the total radius of the recording area. The seek time is therefore less than with conventional two-layer optical disks, and the memory required for seamless (uninterrupted) reproduction can therefore also be reduced.

With a two-layer optical disk thus comprised, the data seek distance for data recorded across the first and second recording layers will always be less than the total radius of the recording area and less than a constant value. The seek time is therefore less than with conventional two-layer optical disks and less than a constant value, and the memory required for seamless (uninterrupted) reproduction can also be a constant amount less than conventionally required.

The seek time when accessing information called from the first information is also less than conventionally, and the wait time when referencing this second information can therefore also be shortened because the seek time is shortened by this configuration.

Tracking can also be maintained after refocusing irrespective of where refocusing occurs, and system errors can therefore be prevented, because a signal track is always recorded at substantially the same radial positions on both recording layers with the configuration of the invention.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described below with reference to the accompanying figures.

Embodiment 1

Figure 1A:
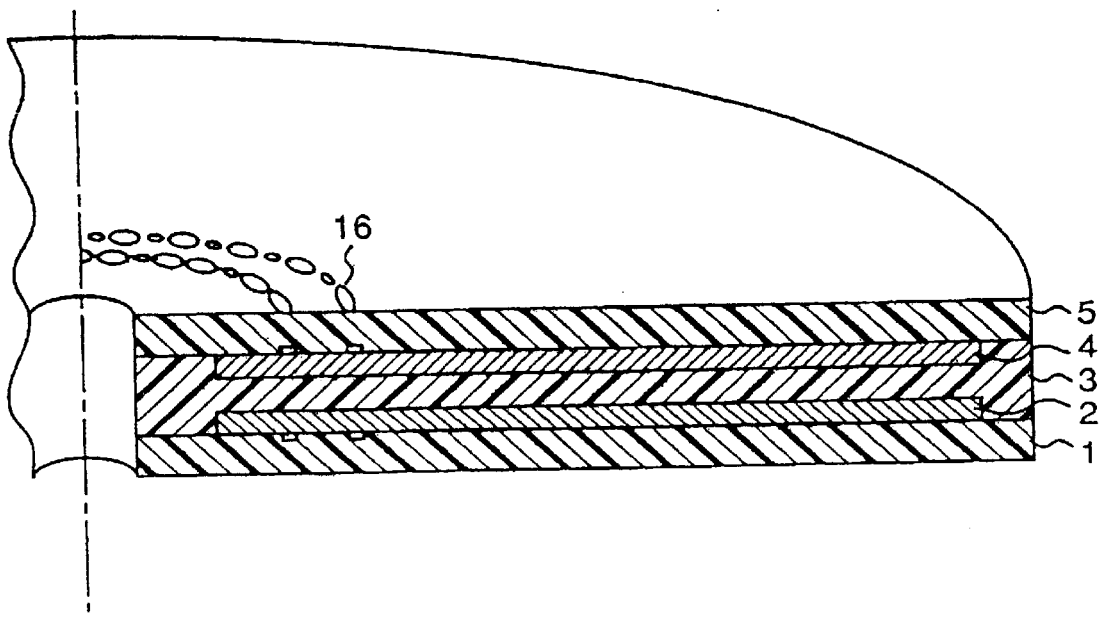
FIG. 1A is a cross sectional diagram of a two-layer optical disk according to the first embodiment of the invention.

FIG. 1A is a cross sectional diagram of a two-layer optical disk according to a preferred embodiment of the invention. Shown in FIG. 1A are the resin base 1, first recording layer 2, resin bond layer 3, second recording layer 4, and resin base 5. Data bits 16 are recorded to the first and second recording layers in spiral or concentric recording tracks. Note that the data bits 16 may be formed as physical pits and lands, or as amorphous bits formed by effecting a (chemical) phase change in the recording film. The first and second recording layers 2 and 4 are made of thin metallic films. For example, the first recording layer 2 is made of an aluminum layer of 80 nm, and the second recording layer 2 is made of a gold layer of 13 nm. For the first and second layers, other metals, such as a compound of Ge.Te.Sb can be used. The same applies for the other embodiments.

Figure 1B:
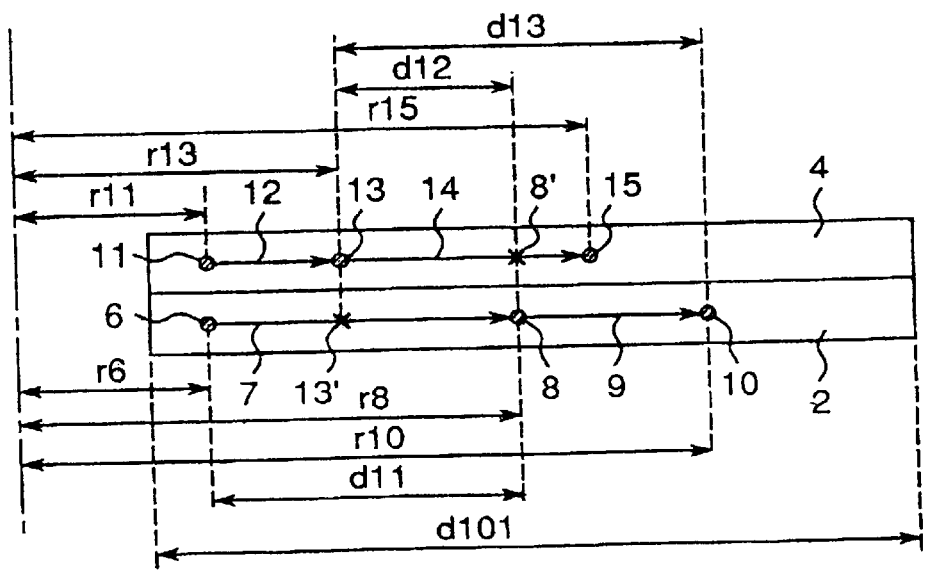
FIG. 1B is used to describe the arrangement of the data recorded thereby.

The arrangement of data recorded to a two-layer optical disk according to this first embodiment is shown in FIG. 1B. As shown in FIG. 1B, the first data block 7 obtained by dividing the continuous information into plural blocks is recorded to the first recording layer from position 6 (radius r6) toward the outside circumference of the disk to position 8 (radius r8), and the third data block 9 is next recorded from position 8 (radius r8) to position 10 (radius r10). The second data block 12, similarly obtained by dividing the continuous source data, is recorded to the second recording layer toward the outside circumference from position 11 (radius r11) to position 13 (radius r13), and the fourth data block 14 is then recorded to position 15 (radius r15).

It should be noted that the capacity of each data block is less than the entire storage capacity of the first recording layer.

Operation with a two-layer optical disk thus comprised is described below.

Different size blocks 7, 12, 9 and 14 are read sequentially in said order. Note that the first recording layer 2 contains the odd numbered orders (first and third) of the reading sequence blocks, and the second recording layer 4 contains the even numbered orders (second and fourth) of the reading sequence blocks. For this purpose, a table indicating the addresses at positions 6, 8, 11, 13, 8, 10, 13, 15 is recorded in a control data area in the optical disk. By following the positions 6, 8, 11, 13, 8, 10, 13, 15 sequentially, the above sequential reading can be accomplished. The recording can be done in a similar manner.

When the recorded information is reproduced continuously, it is necessary to seek position 11 from position 8 after reproducing the first data block 7. This seek time $T_{11}$ can be written $T_{11}=T_j+T_s(d11)$ where $T_j$ is the refocusing time from position 8 to 8', and $T_s(d11)$ is the seek time for distance d11 from radius r8 to radius r11 (d11=r8−r11).

Position 8 is a position within the recording area between the recording start and end positions in the present embodiment. As a result, d11<d101, and the seek time $T_s(d11)$ is therefore less than $T_s(d101)$. The seek time is $T_{11}<T_{101}$, so the seek (access) time is reduced, and less memory is required for seamless (uninterrupted) reproduction.

After the second data block 12 is reproduced, it is again necessary to seek position 8 from position 13. This seek time $T_{12}$ can be written $T_{12}=T_j+T_s(d12)$ where $T_j$ is the refocusing time from position 13 to 13', and $T_s(d12)$ is the seek time for distance d12 from radius r13' to radius r8 (d12=r8−r13).

Positions 8 and 13 are positions within the recording area between the recording start and end positions in the present embodiment. As a result, d12<d101, and the seek time $T_s(d12)$ is therefore less than $T_s(d101)$. The seek time is $T_{12}<T_{101}$, so the seek (access) time is reduced, and less memory is required for seamless (uninterrupted) reproduction.

After the third data block 9 is reproduced, it is again necessary to seek position 13 from position 10. This seek time $T_{13}$ can be written $T_{13}=T_j+T_s(d13)$ where $T_j$ is the refocusing time from position 13' to 13, and $T_s(d13)$ is the seek time for distance d13 from radius r10 to radius r13' (d13= r10−r13).

Position 13 is within the recording area between the recording start and end positions in the present embodiment. As a result, d13<d101, and the seek time $T_s(d13)$ is therefore less than $T_s(d101)$. The seek time is $T_{13}<T_{101}$, so the seek (access) time is reduced, and less memory is required for seamless (uninterrupted) reproduction.

It should be noted that the first embodiment above has been described with reference to two-layer optical disks sequentially recorded starting with the first data block at the inside circumference and recording toward the outside circumference. The invention shall not be thus limited, however, and the same effect can be obtained recording from the outside circumference toward the inside circumference. It will also be obvious that positions 6 and 11 may be the recording start position at the outside circumference of the disk.

With a two-layer optical disk comprising two data recording layers whereby the data recorded to both layers can be detected by emitting light to the recording layers from only one side of the disk characterized according to the present embodiment by dividing the continuous information into three or more plural data blocks where the capacity of each data block is less than the storage capacity of one recording layer, and then recording the odd-numbered data blocks to one recording layer either from the inside circumference to the outside circumference, or from the outside circumference to the inside circumference, and recording the even-numbered data blocks to the other recording layer from the inside circumference to the outside circumference, or from the outside circumference to the inside circumference, the seek distance in the data block recording area is less than the radius of the total recording area. The seek time can therefore be shortened, and the memory requirement for seamless (uninterrupted) reproduction can be reduced.

Embodiment 2

Figure 2A:
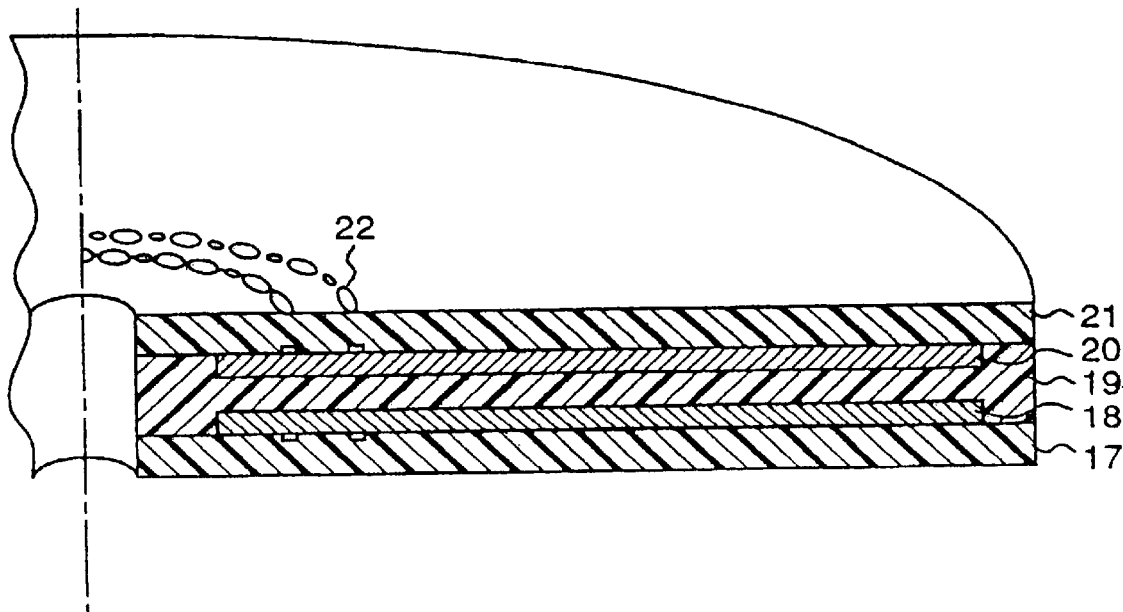
FIG. 2A is a cross sectional diagram of a two-layer optical disk according to the second embodiment of the invention.

FIG. 2A is a cross sectional diagram of a two-layer optical disk according to an alternative embodiment of the invention. Shown in FIG. 2A are the resin base 17, first recording layer 18, resin bond layer 19, second recording layer 20, and resin base 21. Data bits 22 are recorded to the first and second recording layers in spiral or concentric recording tracks. Note that the data bits 16 may be formed as physical pits and lands, or as amorphous bits formed by effecting a (chemical) phase change in the recording film.

Figure 2B:
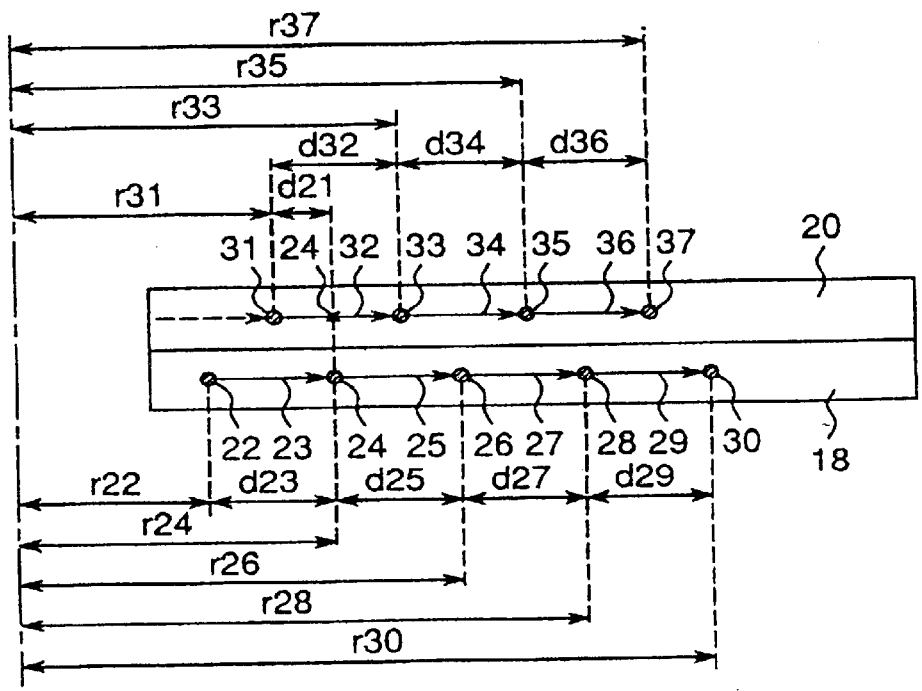
FIG. 2B is used to describe the arrangement of the data recorded thereby.

The arrangement of data recorded to a two-layer optical disk according to this first embodiment is shown in FIG. 2B. As shown in FIG. 2B, the first data block 23 obtained by dividing the continuous information into plural blocks is recorded to the first recording layer from position 22 (radius r22) at the inside circumference toward the outside circumference of the disk to position 24 (radius r24), the third data block 25 is next recorded to position 26 (radius r26), the fifth data block 27 is then recorded to position 28 (radius r28), and the seventh data block 29 is recorded to position 30 (radius r30).

Data is similarly recorded to the second recording layer. The second data block 32 obtained by dividing the continuous information into plural blocks is recorded from position 31 (radius r31) at the inside circumference toward the outside circumference of the disk to position 33 (radius r33), the fourth data block 34 is next recorded to position 35 (radius r35), and the sixth data block 36 is recorded to position 37 (radius r37).

It should be noted that the capacity of each data block is less than the entire storage capacity of one recording layer, and each data block is equal in size. The recording start position 31 of the second data block is also controlled so that $r22 \leq r31 \leq r24$.

Furthermore, if the diameter of the first data block on the recording layer is d23, the diameter of the second data block is d32, the diameter of the third data block is d25, the diameter of the fourth data block is d34, the diameter of the fifth data block is d27, the diameter of the sixth data block is d36, and the diameter of the seventh data block is d29, $d23=d32=d25=d34=d29=d36$ when data is recorded so that the data volume per revolution is equal. When the data is recorded with a constant bit length, $d23 \geq d32 \geq d25 \geq d34 \geq d29 \geq d36$.

Operation with a two-layer optical disk thus comprised is described below.

The same size blocks 23, 32, 25, 34, 27, 36 and 29 are read sequentially in said order. Note that the first recording layer 18 contains the odd numbered orders (first, third, fifth and seventh) of the reading sequence blocks, and the second recording layer 20 contains the even numbered orders (second, fourth and sixth) of the reading sequence blocks. For this purpose, a counter for counting one block size may be provided in a reproducing circuit. Instead of the counter, a table as described in the first embodiment can be stored in the optical disk. The recording can be done in a similar manner.

When the recorded information is reproduced continuously, it is necessary to seek position 31 from position 24 after reproducing the first data block 23. This seek time T21 can be written $T_{21}=T_j+T_s(d_{21})$ where $T_j$ is the refocusing time from position 24 to 24', and $T_s(d_{21})$ is the seek time for distance d21 from radius r24' to radius r31 (d21=r24−r31).

Distance d21 is always less than d101 with the present embodiment because the data block capacity is less than the total capacity of the recording layer. As a result, the seek time $T_s(d_{21})$ from 24' to 31 is short. In addition, $0 \leq d_{21} \leq r_{33}-r_{31}=d_{32} \leq d_{23}$ because $r_{22} \leq r_{31} \leq r_{24}$, and $T_s(d_{21}) \leq T_s(d_{23})$ if $T_s(d_{23})$ is the seek time for distance d23. Distance d23 is determined by the capacity of the first data block, but is constant in the present embodiment because each data block is equal in size. Seek time $T_s(d_{23})$ is therefore also constant. Thus, $T_{21}=T_j+T_s(d_{21})$, and $T_{21} \leq T_j+T_s(d_{23})$, the required memory is a constant size equivalent to that sufficient to store the data output during time $T_j+T_s(d_{23})$, and the drive design is thus simplified.

It will also be obvious that in this second embodiment position 22 may be the recording start position at the outside circumference of the disk.

With a two-layer optical disk comprising two data recording layers whereby the data recorded to both layers can be detected by emitting light to the recording layers from only one side of the disk according to the present embodiment, continuous information is divided into plural data blocks where the capacity of each data block is less than the storage capacity of one recording layer and is equal in each data block, the odd-numbered data blocks are then recorded to one recording layer either from the inside circumference to the outside circumference and the even-numbered data blocks are then recorded to the other recording layer from the inside circumference to the outside circumference with the second data block recorded from a radial position within the recording area of the first data block. The seek time can therefore be shortened, and the memory required for seamless (uninterrupted) reproduction can be reduced to less than a known constant amount.

Embodiment 3

Figure 3A:
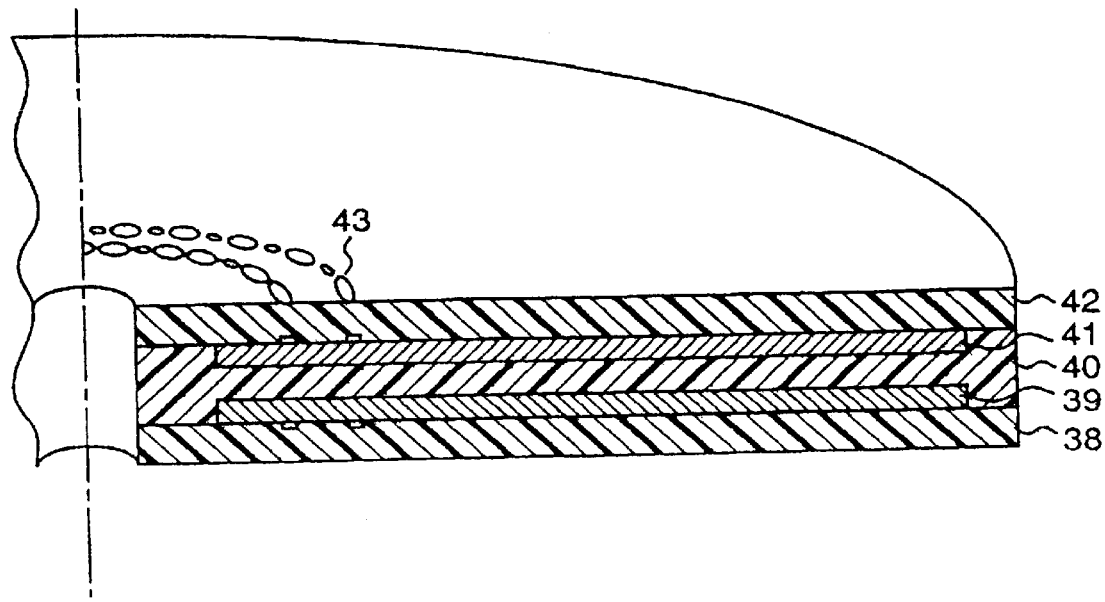
FIG. 3A is a cross sectional diagram of a two-layer optical disk according to the third embodiment of the invention.

FIG. 3A is a cross sectional diagram of a two-layer optical disk according to a third embodiment of the invention. Shown in FIG. 3A are the resin base 38, first recording layer 39, resin bond layer 40, second recording layer 41, and resin base 42. Data bits 43 are recorded to the first and second recording layers in spiral or concentric recording tracks. Note that the data bits 43 may be formed as physical pits and lands, or as amorphous bits formed by effecting a (chemical) phase change in the recording film.

Figure 3B:
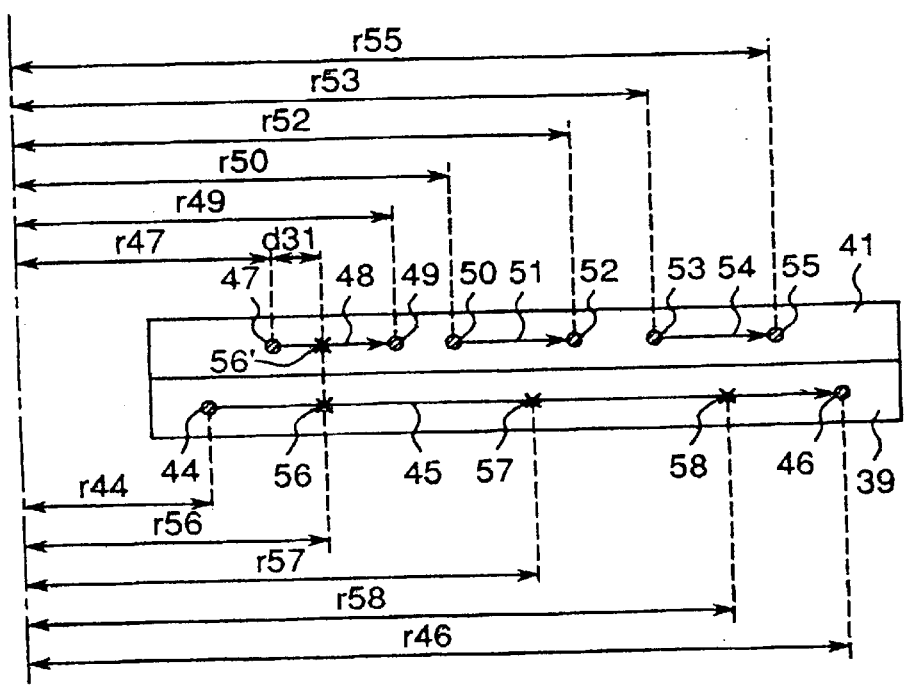
FIG. 3B is used to describe the arrangement of the data recorded thereby.

The arrangement of data recorded to a two-layer optical disk according to this third embodiment is shown in FIG. 3B. As shown in FIG. 3B, the first information 45 is recorded across the first recording layer from position 44 (radius r44) at the inside circumference to position 46 (radius r46) at approximately the outside circumference of the disk.

The second data block 48 called from the first information 45 is recorded to the second recording layer from position 47 (radius r47) to position 49 (radius r49) such that $r_{47} \leq r_{56} \leq r_{49}$. Note that position 56 (radius r56) here is the position in the first information at which the call to the second information is generated.

The third data block 51 called from the first information 45 is recorded to the second recording layer from position 50 (radius r50) to position 52 (radius r52) such that $r_{50} \leq r_{57} \leq r_{52}$. Note that position 57 (radius r57) here is the position in the first information at which the call to the third data block 51 is generated.

The fourth data block 54 called from the first information 45 is recorded to the second recording layer from position 53 (radius r53) to position 55 (radius r55) such that $r_{53} \leq r_{58} \leq r_{55}$. Note that position 58 (radius r58) here is the position in the first information at which the call to the fourth data block 54 is generated.

Operation with a two-layer optical disk thus comprised is described below.

A block 45 is read from the beginning 44 to the end 46, but the reading is temporarily stopped at interruption positions 56, 57 and 58. At interruption position 56, a selection between (i) insert an auxiliary data block 48, and (ii) continue without any insertion, is made. Similarly, at interruption position 57, a selection between (i) insert an auxiliary data block 51, and (ii) continue without any insertion, is made, and at interruption position 58, a selection between (i) insert an auxiliary data block 54, and (ii) continue without any insertion, is made. The block 45 may be a game software, and auxiliary blocks 48, 51 and 54 may be interruptions providing explanations on how to proceed the game.

When the information thus recorded is reproduced, a call to access the second data block 48 is generated at position 56 while reproducing the first information. This makes it necessary to seek position 47 from position 56. This seek time T31 can be written $T_{31}=T_j+T_s(d_{31})$ where $T_j$ is the refocusing time from position 56 to 56', and $T_s(d_{31})$ is the seek time for distance d31 from radius r56' to radius r47 (d31=r56−r47). Because $r_{47} \leq r_{56} \leq r_{49}$, $0 \leq d_{31} \leq r_{49}-r_{47}$.

The seek time is therefore reduced, and the wait time is therefore reduced, because the seek distance is always shorter than the distance (r49−r47) corresponding to the size of the data blocks used to record this second information. This is also true when seeking position 50 from position 57 to access the third data block 51, and when seeking position 53 from position 58 to access the fourth data block 54.

With a two-layer optical disk comprising two data recording layers whereby the data recorded to both layers can be detected by emitting light to the recording layers from only one side of the disk according to the present embodiment, data of a first information type is recorded to one recording layer, plural data that can be called from the first information is recorded to the other recording layer, and the information that can be called from the first information is recorded in a form covering a radial position in the first information from which the call may be generated. The seek time required to access information on the second recording layer from the first information recorded to the first recording layer can therefore be reduced, and the wait time can thus be reduced.

It should be noted that the present embodiment has been described with reference to two-layer optical disks on which data is recorded from the inside circumference toward the outside circumference. The invention shall not be thus limited, however, and the same effect can be obtained recording from the outside circumference toward the inside circumference.

Embodiment 4

Figure 4A:
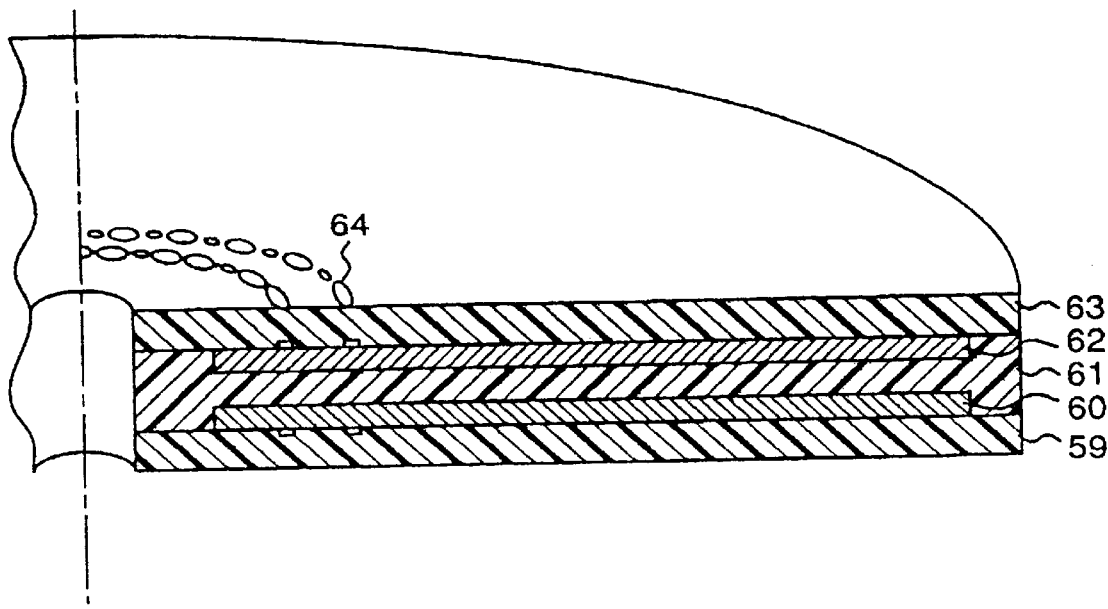
FIG. 4A is a cross sectional diagram of a two-layer optical disk according to the fourth embodiment of the invention.

FIG. 4A is a cross sectional diagram of a two-layer optical disk according to a fourth embodiment of the invention.

Shown in FIG. 4A are the resin base 59, first recording layer 60, resin bond layer 61, second recording layer 62, and resin base 63. Data bits 64 are recorded to the first and second recording layers in spiral or concentric recording tracks. Note that the data bits 64 may be formed as physical pits and lands, or as amorphous bits formed by effecting a (chemical) phase change in the recording film.

Figure 4B:
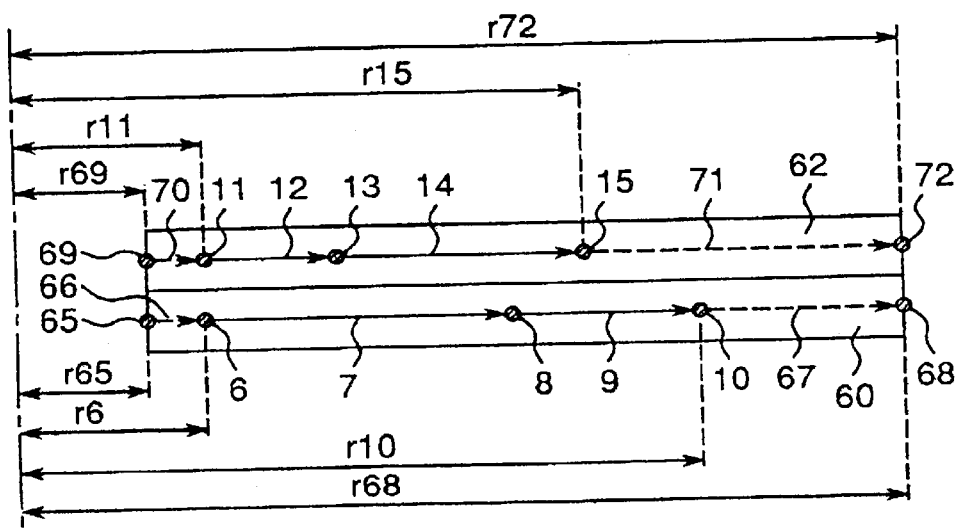
FIG. 4B is used to describe the arrangement of the data recorded thereby.

The arrangement of data recorded to a two-layer optical disk according to this embodiment is shown in FIG. 4B. Note that like reference numbers are used for like parts in FIGS. 4B and 1B.

Referring to FIG. 4B, dummy data 66, 67, 70, and 71 are respectively recorded in the area from the recording start position 65 (radius r65) of the recording area in the first recording layer to the recording start position 6 (radius r6) of the first data block 7; the area from the end point 10 (radius r10) of the third data block 9 to the end point 68 (radius r68) of the first recording layer; the area from the recording start position 69 (radius r69) of the recording area in the second recording layer to the recording start position 11 (radius r11) of the second data block 12; and the area from the end point 15 (radius r15) of the fourth data block 14 to the end point 72 (radius r72) of the second recording layer.

Operation with a two-layer optical disk thus comprised is described below.

The operation is the same as the first embodiment.

Recording dummy data as thus described assures that data is recorded to the entire recording area of both the first and second recording layers. This assures that data is recorded wherever the read beam is refocused on the first and second recording layers, enabling tracking to be maintained and thus preventing system errors.

With a two-layer optical disk comprising two data recording layers whereby the data recorded to both layers can be detected by emitting light to the recording layers from only one side of the disk according to the present embodiment, tracking can be maintained, and system errors thereby prevented, irrespective of where the focus is readjusted by recording dummy data to those parts of the recording areas to which meaningful data is not recorded on the first and second recording layers.

It will be obvious that while this embodiment has been described as recording dummy data to the blank data areas, any type of information may be recorded insofar as the recorded data forms bit sequence signal tracks.

It should be noted that this fourth embodiment has been described as sequentially recording all data blocks from the inside circumference toward the outside circumference. The invention shall not be so limited, however, and the same effect can be obtained by recording from the outside circumference toward the inside circumference.

Embodiment 5

Figure 5A:
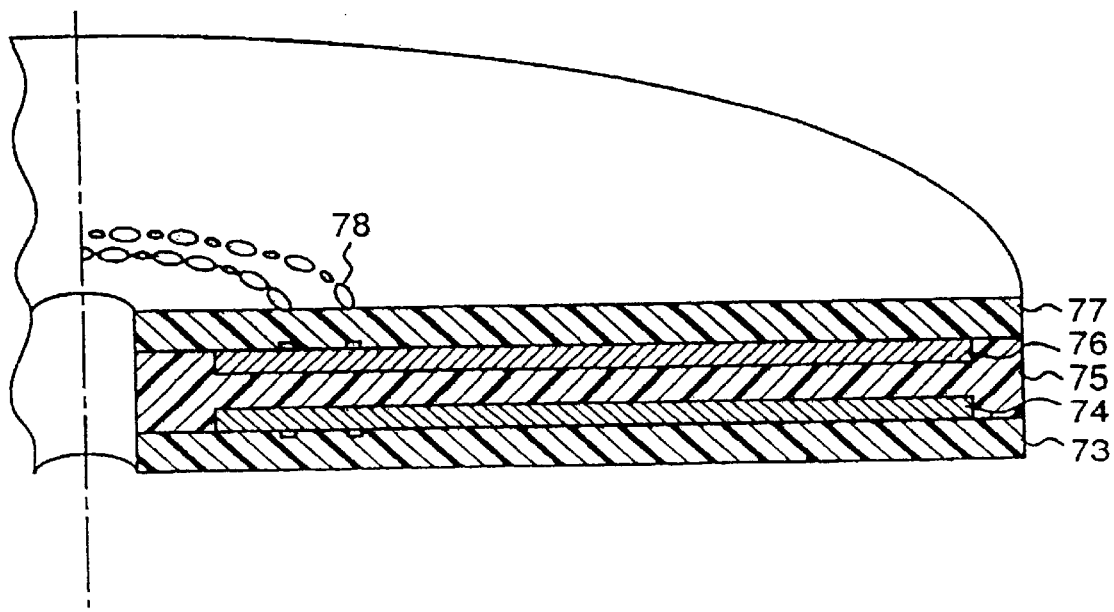
FIG. 5A is a cross sectional diagram of a two-layer optical disk according to the fifth embodiment of the invention.

FIG. 5A is a cross sectional diagram of a two-layer optical disk according to a fifth embodiment of the invention. Shown in FIG. 5A are the resin base 73, first recording layer 74, resin bond layer 75, second recording layer 76, and resin base 77. Data bits 78 are recorded to the first and second recording layers in spiral or concentric recording tracks. Note that the data bits 78 may be formed as physical pits and lands, or as amorphous bits formed by effecting a (chemical) phase change in the recording film.

Figure 5B:
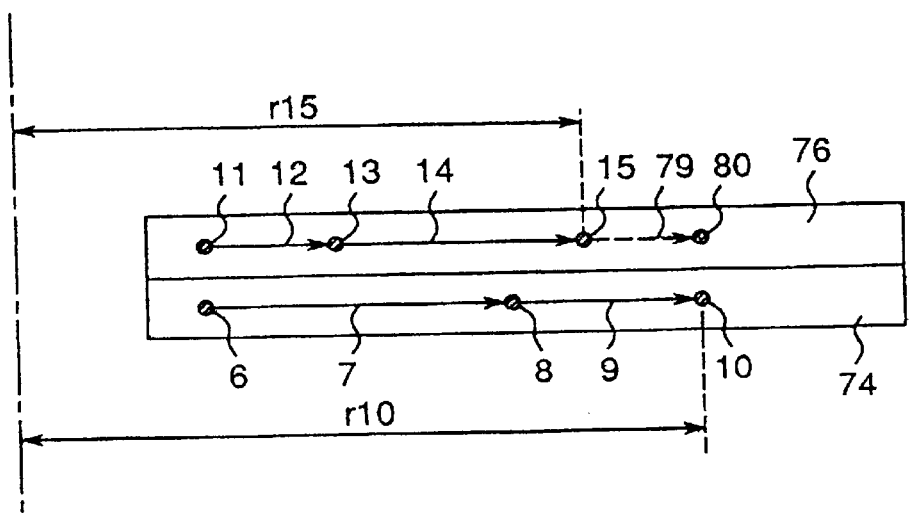
FIG. 5B is used to describe the arrangement of the data recorded thereby.

The arrangement of data recorded to a two-layer optical disk according to this embodiment is shown in FIG. 5B. Note that like reference numbers are used for like parts in FIGS. 5B and 1B. Note also that dummy data 79 is recorded to the second recording layer from position 15 (radius r15) to position 80 (radius r10).

Operation with a two-layer optical disk thus comprised is described below.

The operation is the same as the first embodiment.

Recording dummy data 79 as thus described assures that data is recorded to the second recording layer at any radial position at which data is recorded to the first recording layer. This assures that data is recorded wherever the read beam is refocused during data reproduction, and tracking can therefore be maintained to prevent system errors. Disk production time can also be reduced because the amount of dummy data recorded is minimized.

With a two-layer optical disk comprising two data recording layers whereby the data recorded to both layers can be detected by emitting light to the recording layers from only one side of the disk according to the present embodiment, tracking can be maintained irrespective of where the focus is readjusted by recording dummy data to the recording layer to which meaningful data is not recorded at any radial position whereat meaningful information is recorded to one recording layer but is not recorded to the other recording layer.

It will be obvious that while this embodiment has been described as recording dummy data to the blank data areas described above, any type of information may be recorded insofar as the recorded data forms bit sequence signal tracks.

It should be noted that this embodiment has been described as sequentially recording all data blocks from the inside circumference toward the outside circumference. The invention shall not be so limited, however, and the same effect can be obtained by recording from the outside circumference toward the inside circumference.

Embodiment 6

Figure 6A:
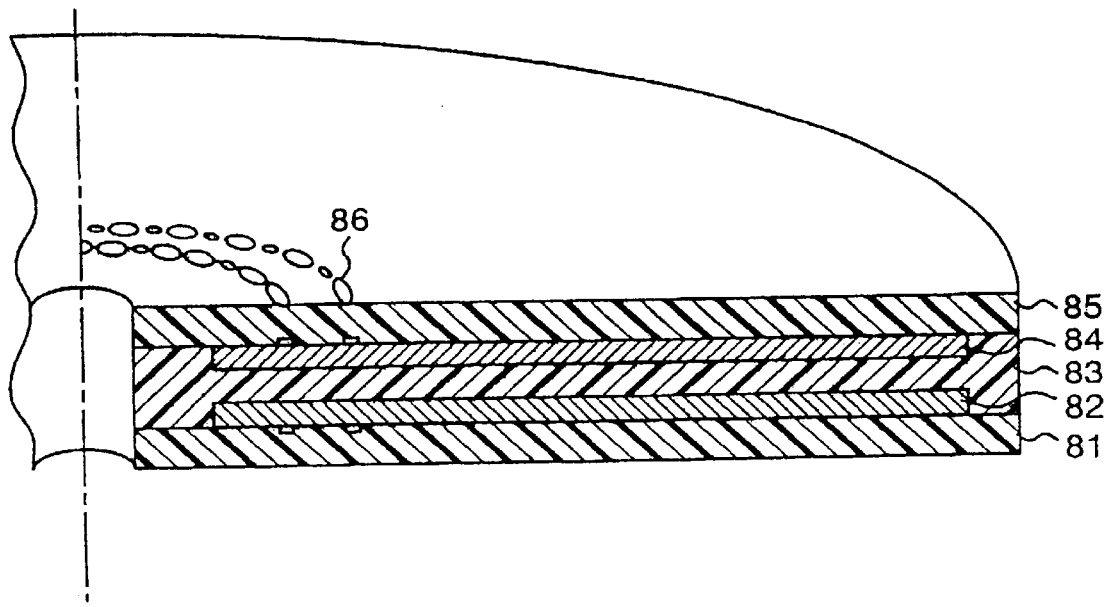
FIG. 6A is a cross sectional diagram of a two-layer optical disk according to the sixth embodiment of the invention.

FIG. 6A is a cross sectional diagram of a two-layer optical disk according to a sixth embodiment of the invention. Shown in FIG. 6A are the resin base 81, first recording layer 82, resin bond layer 83, second recording layer 84, and resin base 85. Data bits 86 are recorded to the first and second recording layers in spiral or concentric recording tracks. Note that the data bits 86 may be formed as physical pits and lands, or as amorphous bits formed by effecting a (chemical) phase change in the recording film.

Figure 6B:
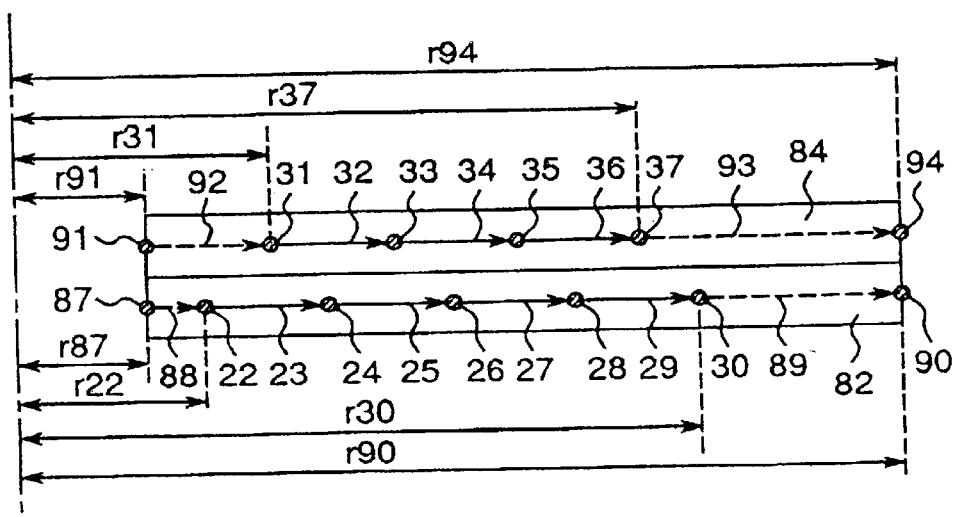
FIG. 6B is used to describe the arrangement of the data recorded thereby.

Referring to FIG. 6B, dummy data 88, 89, 92, and 93 are respectively recorded in the area from the recording start position 87 (radius r87) of the recording area in the first recording layer to the recording start position 22 (radius r22) of the first data block 23; the area from the end point 30 (radius r30) of the seventh data block 29 to the end point 90 (radius r90) of the first recording layer; the area from the recording start position 91 (radius r91) of the recording area in the second recording layer to the recording start position 31 (radius r31) of the second data block 32; and the area from the end point 37 (radius r37) of the sixth data block 36 to the end point 94 (radius r94) of the second recording layer.

Operation with a two-layer optical disk thus comprised is described below.

The operation is the same as the second embodiment.

Recording dummy data as thus described assures that data is recorded to the entire recording area of both the first and second recording layers. This assures that data is recorded wherever the read beam is refocused on the first and second recording layers, enabling tracking to be maintained and thus preventing system errors.

With a two-layer optical disk comprising two data recording layers whereby the data recorded to both layers can be detected by emitting light to the recording layers from only one side of the disk according to the present embodiment, tracking can be maintained, and system errors thereby prevented, irrespective of where the focus is readjusted by recording dummy data to those parts of the recording areas to which meaningful data is not recorded on the first and second recording layers.

It will be obvious that while this embodiment has been described as recording dummy data to the blank data areas, any type of information may be recorded insofar as the recorded data forms bit sequence signal tracks.

It should be noted that this sixth embodiment has been described as sequentially recording all data blocks from the inside circumference toward the outside circumference. The invention shall not be so limited, however, and the same effect can be obtained by recording from the outside circumference toward the inside circumference.

Embodiment 7

Figure 7A:
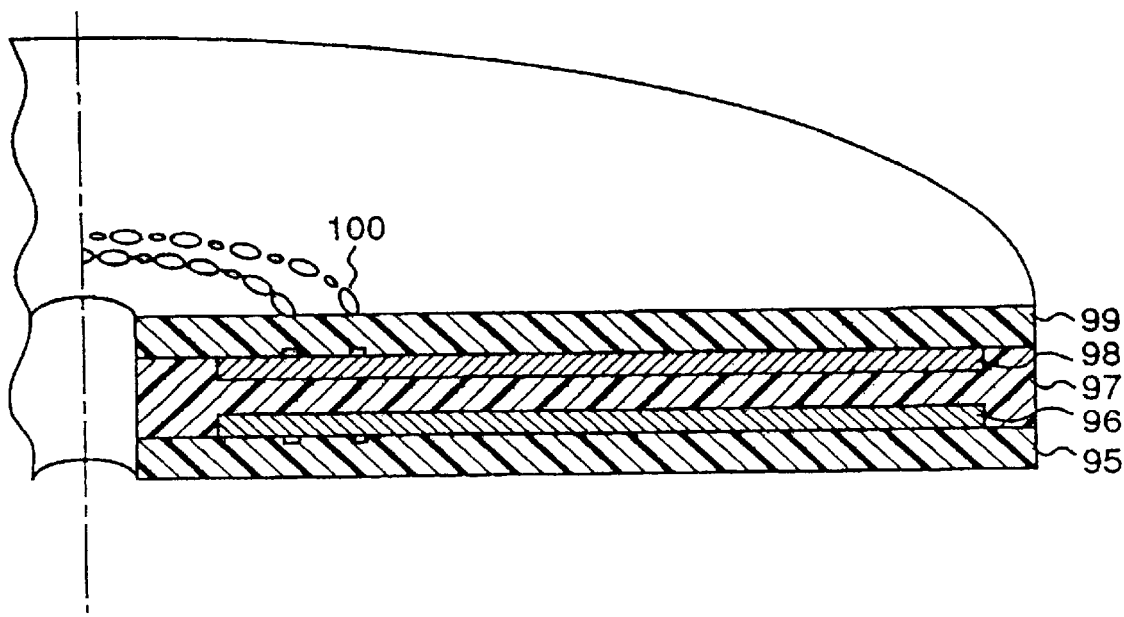
FIG. 7A is a cross sectional diagram of a two-layer optical disk according to the seventh embodiment of the invention.

FIG. 7A is a cross sectional diagram of a two-layer optical disk according to a fifth embodiment of the invention. Shown in FIG. 7A are the resin base 95, first recording layer 96, resin bond layer 97, second recording layer 98, and resin base 99. Data bits 100 are recorded to the first and second recording layers in spiral or concentric recording tracks. Note that the data bits 100 may be formed as physical pits and lands, or as amorphous bits formed by effecting a (chemical) phase change in the recording film.

Figure 7B:
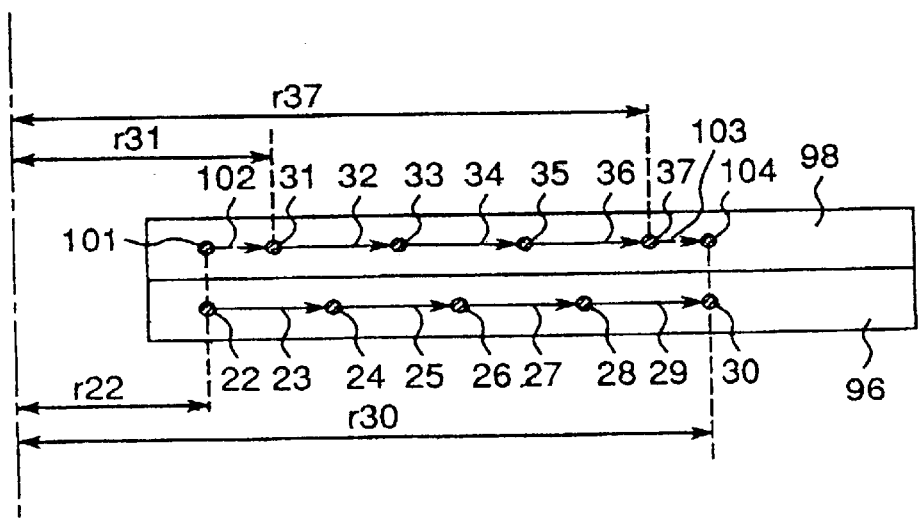
FIG. 7B is used to describe the arrangement of the data recorded thereby.

The arrangement of data recorded to a two-layer optical disk according to this embodiment is shown in FIG. 7B. Note that like reference numbers are used for like parts in FIGS. 7B and 1B. Note also that dummy data 102 and 103 are respectively recorded to the second recording layer from position 101 (radius r22) to the starting point 31 (radius r31) of the second data block 32, and from the end point 37 (radius r37) of the sixth data block 36 to position 104 at radius r30 on the second recording layer.

Operation with a two-layer optical disk thus comprised is described below.

The operation is the same as the second embodiment.

Recording dummy data 102 and 103 as thus described assures that data is recorded to the second recording layer at the same radial positions of the first recording layer to which data is recorded. This assures that data is recorded wherever the read beam is refocused during data reproduction, and tracking can therefore be maintained to prevent system errors. Disk production time can also be reduced because the amount of dummy data recorded is minimized.

With a two-layer optical disk comprising two data recording layers whereby the data recorded to both layers can is be detected by emitting light to the recording layers from only one side of the disk according to the present embodiment, tracking can be maintained irrespective of where the focus is readjusted, and disk production time can be reduced because less dummy data is recorded, by recording dummy data to the recording layer to which meaningful data is not recorded at any radial position whereat meaningful information is recorded to one recording layer but is not recorded to the other recording layer.

It will be obvious that while this embodiment has been described as recording dummy data to the blank data areas described above, any type of information may be recorded insofar as the recorded data forms bit sequence signal tracks.

It should be noted that this embodiment has been described as sequentially recording all data blocks from the inside circumference toward the outside circumference. The invention shall not be so limited, however, and the same effect can be obtained by recording from the outside circumference toward the inside circumference.

Embodiment 8

Figure 8A:
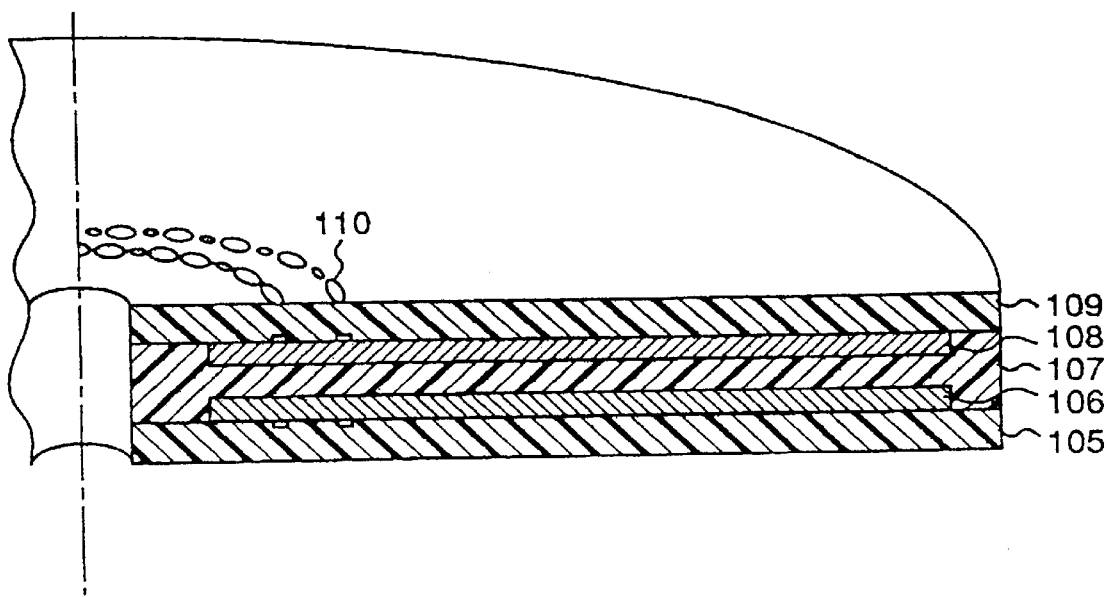
FIG. 8A is a cross sectional diagram of a two-layer optical disk according to the eighth embodiment of the invention.

FIG. 8A is a cross sectional diagram of a two-layer optical disk according to an eighth embodiment of the invention.

Shown in FIG. 8A are the resin base 105, first recording layer 106, resin bond layer 107, second recording layer 108, and resin base 109. Data bits 110 are recorded to the first and second recording layers in spiral or concentric recording tracks. Note that the data bits 110 may be formed as physical pits and lands, or as amorphous bits formed by effecting a (chemical) phase change in the recording film.

Figure 8B:
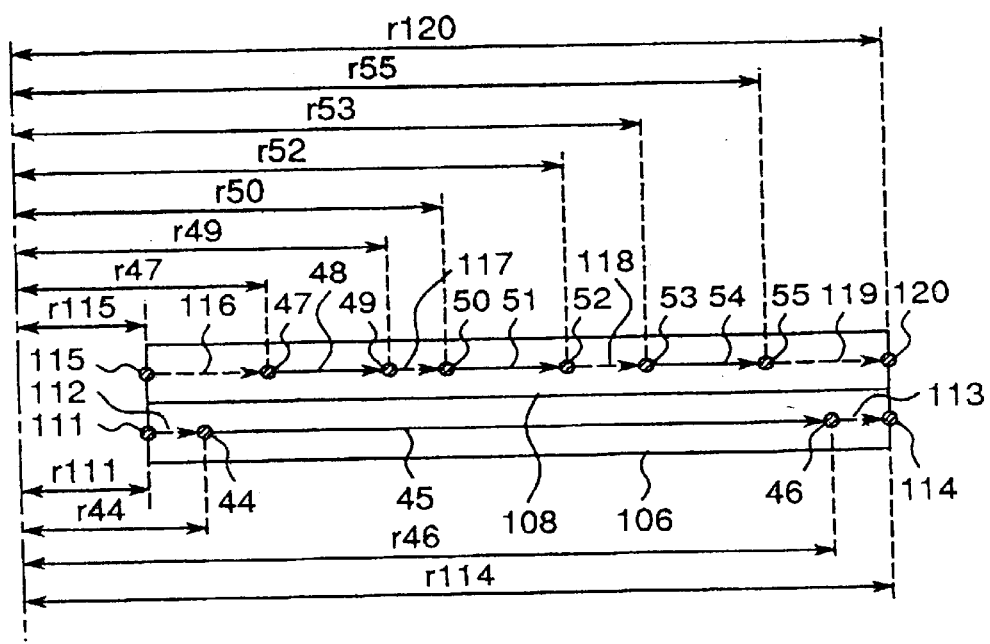
FIG. 8B is used to describe the arrangement of the data recorded thereby.

Referring to FIG. 8B, dummy data 112, 113, 116, 117, 118, and 119 are respectively recorded in the area from the recording start position 111 (radius r111) at the inside circumference of the recording area in the first recording layer to the recording start position 44 (radius r44) of the first information 45; the area from the end point 46 (radius r46) of the first information 45 to the end point 114 (radius r114) of the recording area; from the recording start position 115 (radius r115) at the inside circumference of the recording area in the second recording layer to the starting point 47 (radius r47) of the second data block 48; from the end point 49 of the second data block 48 (radius r49) to the starting point 50 (radius r50) of the third data block 51; from the end point 52 of the third data block 51 (radius r52) to the starting point 53 (radius r53) of the fourth data block 54; and from the end point 55 (radius r55) of the fourth data block 54 to the end point 120 of the recording area (radius r120).

Operation with a two-layer optical disk thus comprised is described below.

The operation is the same as the third embodiment.

Recording dummy data as thus described assures that data is recorded to the entire recording area of both the first and second recording layers. This assures that data is recorded wherever the read beam is refocused on the first and second recording layers, enabling tracking to be maintained and thus preventing system errors.

With a two-layer optical disk comprising two data recording layers whereby the data recorded to both layers can be detected by emitting light to the recording layers from only one side of the disk according to the present embodiment, tracking can be maintained, and system errors thereby prevented, irrespective of where the focus is readjusted by recording dummy data to those parts of the recording areas to which meaningful data is not recorded on the first and second recording layers.

It will be obvious that while this embodiment has been described as recording dummy data to the blank data areas, any type of information may be recorded insofar as the recorded data forms bit sequence signal tracks.

It should be noted that this eighth embodiment has been described as sequentially recording all data blocks from the inside circumference toward the outside circumference. The invention shall not be so limited, however, and the same effect can be obtained by recording from the outside circumference toward the inside circumference.

Embodiment 9

Figure 9A:
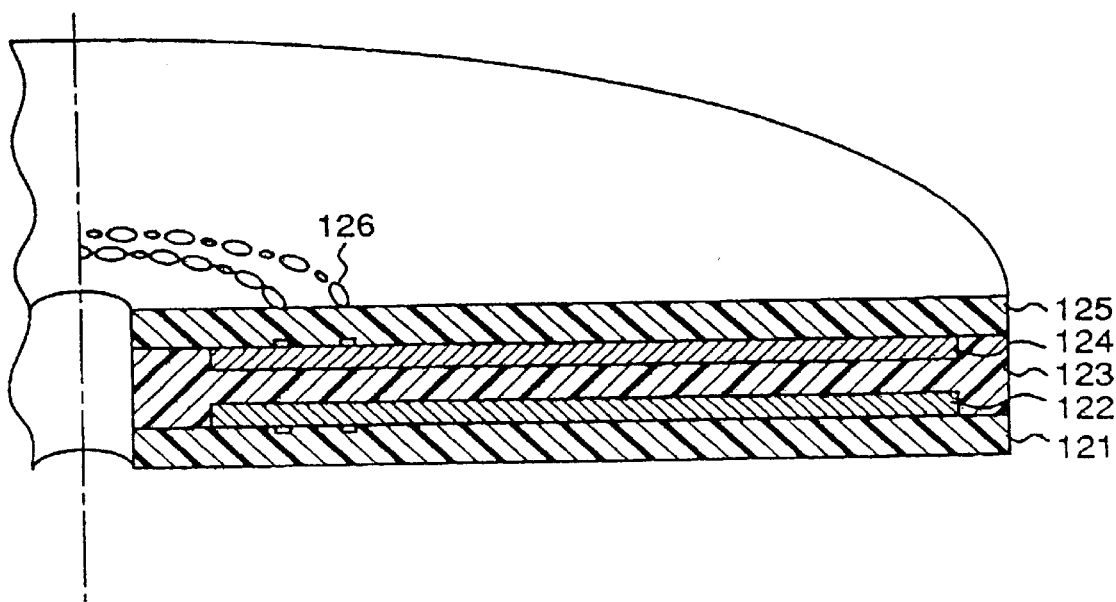
FIG. 9A is a cross sectional diagram of a two-layer optical disk according to the ninth embodiment of the invention.

FIG. 9A is a cross sectional diagram of a two-layer optical disk according to a ninth embodiment of the invention. Shown in FIG. 9A are the resin base 121, first recording layer 122, resin bond layer 123, second recording layer 124, and resin base 125. Data bits 126 are recorded to the first and second recording layers in spiral or concentric recording tracks. Note that the data bits 126 may be formed as physical pits and lands, or as amorphous bits formed by effecting a (chemical) phase change in the recording film.

Figure 9B:
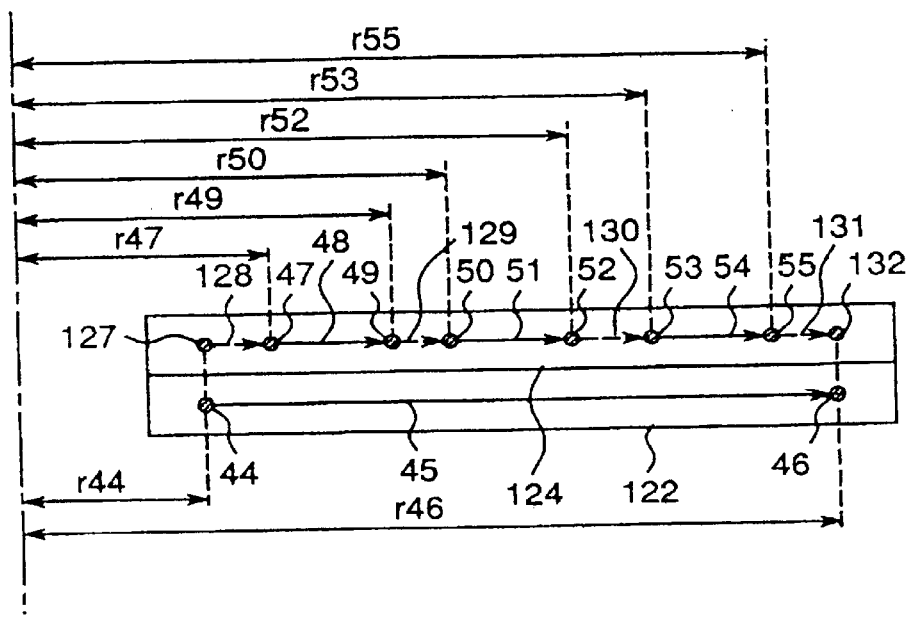
FIG. 9B is used to describe the arrangement of the data recorded thereby.

The arrangement of data recorded to a two-layer optical disk according to this embodiment is shown in FIG. 9B. Note that like reference numbers are used for like parts in FIGS. 9B and 3B.

Referring to FIG. 9B, dummy data 128, 129, 130, and 131 are respectively recorded in the area from the recording start position 127 (radius r44) of the recording area in the second recording layer to the recording start position 47 (radius r47) of the second data block 48 (second information); the area from the end point 49 (radius r49) of the second data block 48 to the starting point 50 (radius r50) of the third data block 51; from the end point 52 (radius r52) of the of the third data block 51 to the recording start position 53 (radius r53) of the fourth data block 54; and from the end point 55 (radius r55) of the fourth data block 54 to position 132 at radius r46 of the second recording layer.

Operation with a two-layer optical disk thus comprised is described below.

The operation is the same as the third embodiment.

Recording dummy data 128, 129, 130, and 131 as thus described assures that data is recorded to the second recording layer at any radial position at which data is recorded to the first recording layer. This assures that data is recorded wherever the read beam is refocused during data reproduction, and tracking can therefore be maintained to prevent system errors. Disk production time can also be reduced because the amount of dummy data recorded is minimized.

With a two-layer optical disk comprising two data recording layers whereby the data recorded to both layers can be detected by emitting light to the recording layers from only one side of the disk according to the present embodiment, tracking can be maintained irrespective of where the focus is readjusted by recording dummy data to the recording layer to which meaningful data is not recorded at any radial position whereat meaningful information is recorded to one recording layer but is not recorded to the other recording layer.

It will be obvious that while this embodiment has been described as recording dummy data to the blank data areas described above, any type of information may be recorded insofar as the recorded data forms bit sequence signal tracks.

It should be noted that this embodiment has been described as sequentially recording all data blocks from the inside circumference toward the outside circumference. The invention shall not be so limited, however, and the same effect can be obtained by recording from the outside circumference toward the inside circumference.

Embodiment 10

Figure 10A:
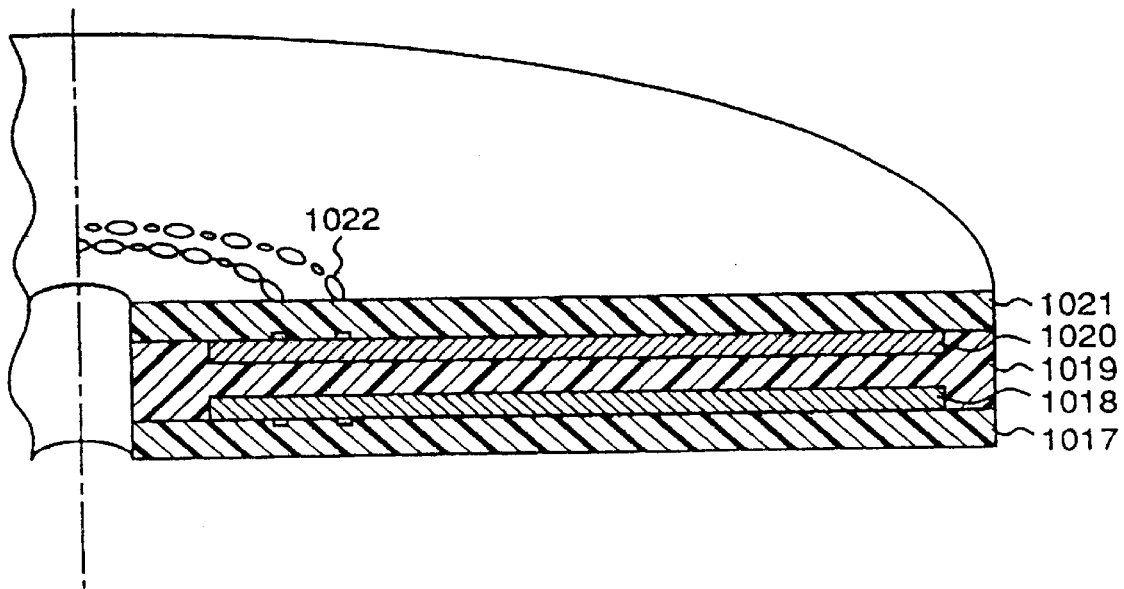
FIG. 10A is a cross sectional diagram of a two-layer optical disk according to the tenth embodiment of the invention.

FIG. 10A is a cross sectional diagram of a two-layer optical disk according to a sixth embodiment of the invention. Shown in FIG. 10A are the resin base 1017, first recording layer 1018, resin bond layer 1019, second recording layer 1020, and resin base 1021. Data bits 1022 are recorded to the first and second recording layers in spiral or concentric recording tracks. Note that the data bits 1022 may be formed as physical pits and lands, or as amorphous bits formed by effecting a (chemical) phase change in the recording film.

Figure 10B:
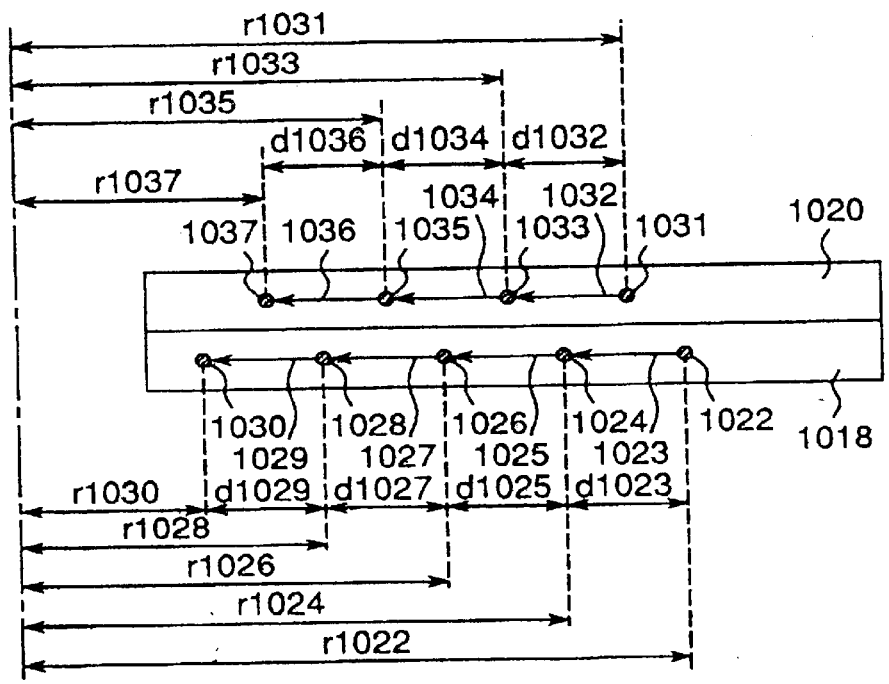
FIG. 10B is used to describe the arrangement of the data recorded thereby.
Figure 11:
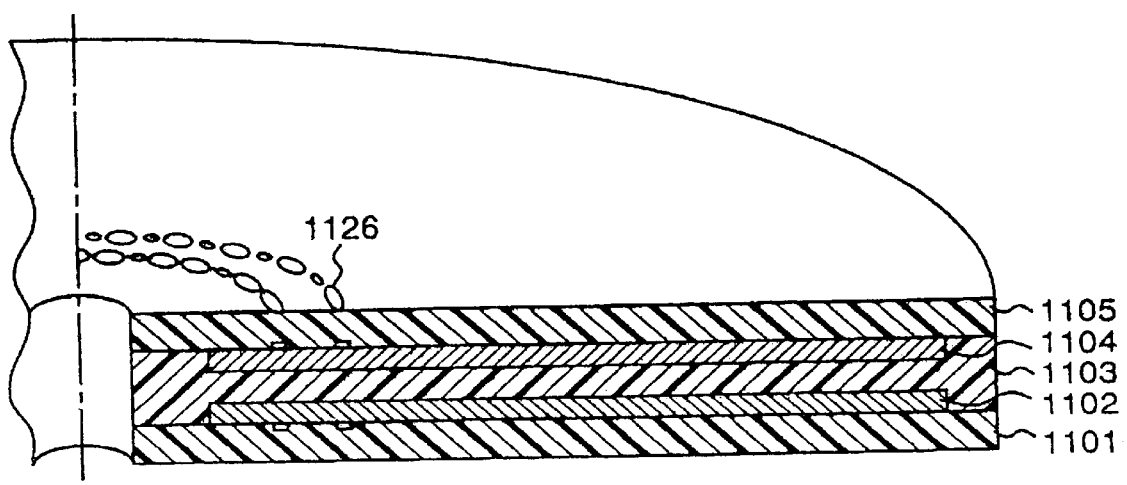
FIG. 11 is a cross sectional diagram of a conventional two-layer optical disk.

The arrangement of data recorded to a two-layer optical disk according to this embodiment is shown in FIG. 10B. As shown in FIG. 10B, the first data block 1023 obtained by dividing the continuous information into plural blocks is recorded to the first recording layer from position 1022 (radius r1022) at the outside circumference of the disk to position 1024 (radius r1024) toward the inside circumference, the third data block 1025 is next recorded to position 1026 (radius r1026), the fifth data block 1027 is next recorded to position 1028 (radius r1028), and the seventh data block 1029 is next recorded to position 1030 (radius r1030).

The second data block 1032, similarly obtained by dividing the continuous source data, is likewise recorded from position 1031 (radius r1031) near the outside circumference to position 1033 (radius r1033) toward the inside circumference, the fourth data block 1034 is then recorded to position 1035 (radius r1035), and the sixth data block 1036 is recorded to position 1037 (radius r1037).

It should be noted that the capacity of each data block is less than the entire storage capacity of one recording layer, and is the same for each data block. The starting point 1031 of the second data block is also controlled such that r1022≧r1031≧r1024.

Furthermore, if the diameter of the first data block on the recording layer is d1023, the diameter of the second data block is d1032, the diameter of the third data block is d1025, the diameter of the fourth data block is d1034, the diameter of the fifth data block is d1027, the diameter of the sixth data block is d1036, and the diameter of the seventh data block is d1029, d1023=d1032=d1025=d1034=d1029=d1036 when data is recorded so that the data volume per revolution is equal. When the data is recorded with a constant bit length, d1023≦d1032≦d1025≦d1034≦d1029≦d1036.

Operation with a two-layer optical disk thus comprised is described below.

The operation is the same as the first embodiment, but the data is read not from the inside to the outside, but from outside to the inside of the optical disk.

When the recorded information is reproduced continuously, it is necessary to seek position 1031 from position 1024 after reproducing the first data block 1023. This seek time $T_{1021}$ can be written $T_{1021}=T_j+T_s(d1021)$ where $T_j$ is the refocusing time from position 1024 to 1024', and $T_s(d1021)$ is the seek time for distance d1021 from radius r1024' to radius r1031 ($d1021=r1031-r1024$).

Distance d1021 is always less than d101 with the present embodiment because the data block capacity is less than the total capacity of the recording layer. As a result, the seek time $T_s(d1021)$ from 1024' to 1031 is short. In addition, $0 \leq d1021 \leq r1031 - r1033 = d1032 \leq d1036$ because r1022≦r1031≦r1024, and $T_s(d1021) \leq T_s(d1036)$ if $T_s(d1036)$ is the seek time for distance d1036. Distance d1036 is determined by the capacity of the seventh data block, but is constant in the present embodiment because each data block is equal in size. Seek time $T_s(d1036)$ is therefore also constant. Thus, $T_{1021}=T_j+T_s(d1021)$, and $T_{1021} \leq T_j+T_s(d1036)$, the required memory is a constant size equivalent to that sufficient to store the data output during time $T_j+T_s(d1036)$, and the drive design is thus simplified.

With a two-layer optical disk comprising two data recording layers whereby the data recorded to both layers can be detected by emitting light to the recording layers from only one side of the disk according to the present embodiment, continuous information is divided into plural data blocks where the capacity of each data block is less than the storage capacity of one recording layer and is equal in each data block, the odd-numbered data blocks are then recorded to one recording layer from the outside circumference to the inside circumference, and the even-numbered data blocks are recorded to the other recording layer from the outside circumference to the inside circumference with the second data block starting from a radial position at which the first data block is present. The seek time can therefore be shortened, and the memory required for seamless (uninterrupted) reproduction can be reduced to less than a known constant amount.

Effects of the invention

An two-layer optical disk comprising two data recording layers whereby the data recorded to both layers can be detected by emitting light to the recording layers from only one side of the disk according to the present invention records data blocks obtained by dividing continuous information into three or more plural data blocks where the capacity of each data block is less than the storage capacity of one recording layer. More specifically, the odd-numbered data blocks are recorded to one recording layer either from the inside circumference to the outside circumference, or from the outside circumference to the inside circumference, and the even-numbered data blocks are recorded to the other recording layer from the inside circumference to the outside circumference, or from the outside circumference to the inside circumference. The data seek distance for data recorded across the first and second recording layers is therefore reduced and, the search time can thus be shortened. The memory required for seamless (uninterrupted) reproduction can also be reduced, and an outstanding two-layer optical disk can be achieved.

A two-layer optical disk comprising two data recording layers whereby the data recorded to both layers can be detected by emitting light to the recording layers from only one side of the disk according to the present invention records data blocks obtained by dividing continuous information into plural data blocks where the capacity of each data block is less than the storage capacity of one recording layer, and the capacity of each data block is the same. More specifically, the odd-numbered data blocks are recorded to one recording layer either from the inside circumference to the outside circumference, or from the outside circumference to the inside circumference, and the even-numbered data blocks are recorded to the other recording layer from the inside circumference to the outside circumference, or from the outside circumference to the inside circumference, with the second data block recorded starting from a radial position at which the first data block is present. The data seek distance for data recorded across the first and second recording layers is therefore reduced, and is less than a known distance, the search time can thus be shortened, the memory required for seamless (uninterrupted) reproduction can be reduced, and an outstanding two-layer optical disk can be achieved.

A two-layer optical disk comprising two data recording layers whereby the data recorded to both layers can be detected by emitting light to the recording layers from only one side of the disk records, according to the present invention, a first type of information to one recording layer, and records plural data that can be called by the first information to the other recording layer in a format including a radial position in the first information from which the call may be generated. An outstanding two-layer optical disk whereby the seek distance required to access data called from the first information is reduced, and the search time can therefore be reduced, and the wait time is thus shortened, can therefore be achieved.

A two-layer optical disk comprising two data recording layers whereby the data recorded to both layers can be detected by emitting light to the recording layers from only one side of the disk comprises according to the present invention recording tracks on both recording layers to substantially the same radial position. An outstanding two-layer optical disk whereby tracking can be maintained after refocusing irrespective of where refocusing occurs can therefore be achieved.

The embodiments 1 to 10 described above can be classified as shown in the table below.

TABLE

|  | Without dummy | With dummy | |
| --- | --- | --- | --- |
|  |  | Up to edge | Partial |
| Odd/Even Various block size | Embo. 1 | Embo. 4 | Embo. 5 |
| Odd/Even Same block size | Embo. 2 (Embo. 10) | Embo. 6 | Embo. 7 |
| With interruption | Embo. 3 | Embo. 8 | Embo. 9 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-layer optical disk, comprising:

a first layer of a disk-shaped recording medium for storing data;

a second layer of a disk-shaped recording medium, positioned over said first layer, for storing data;

a plurality of data blocks stored in said first layer; and a plurality of data blocks stored in said second layer, said data blocks in said first layer and said data blocks in said second layer being alternately linked to present one stream of information, wherein said plurality of data blocks in said first layer and said plurality of data blocks in second layer have a same size.

2. A two-layer optical disk, comprising:

a first layer of a disk-shaped recording medium for storing data;

a second layer of a disk-shaped recording medium, positioned over said first layer, for storing data;

a plurality of data blocks stored in said first layer;

a plurality of data blocks stored in said second layer, said data blocks in said first layer and said data blocks in said second layer being alternately linked to present one stream of information; and dummy data filled in said second layer in areas different from said plurality of data blocks to make a total length of said plurality of data blocks in said second layer equal to a total length of said plurality of data blocks in said first layer.

3. A two-layer optical disk, comprising:

a first layer of a disk-shaped recording medium for storing data;

a second layer of a disk-shaped recording medium, positioned over said first layer, for storing data;

a plurality of data blocks stored in said first layer;

a plurality of data blocks stored in said second layer, said data blocks in said first layer and said data blocks in said second layer being alternately linked to present one stream of information;

first dummy data filled in said first layer in areas different from said plurality of data blocks; and second dummy data filled in said second layer in areas different from said plurality of data blocks to make a length of said plurality of data blocks in said first layer equal to a length of said plurality of data blocks in said second layer.

4. A two-layer optical disk, comprising:

a first layer of a disk-shaped recording medium for storing data;

a second layer of a disk-shaped recording medium, positioned over said first layer, for storing data;

a data block stored in said first layer, said data block having an interruption position; and an auxiliary data block stored in said second layer, said data block in said first layer being interrupted at said interruption position during a reproduction to enable a selection between (i) inserting said auxiliary data block from said second layer into said interruption position, and (ii) continuing said reproduction without insertion of said auxiliary data block into said interruption position.

5. A method for reproducing a two-layer optical disk having a first layer of a disk shaped recording medium for storing data, a second layer of the disk shaped recording medium that is positioned over the first layer for storing data, a data block being stored in the first layer, the data block having an interruption position, and an auxiliary data block that is stored in the second layer, the method comprising:

reading the data block in the first layer up to the interruption position; and selecting between inserting the auxiliary data block from the second layer at the interruption position, and continuing the reading of the data block in the first layer without any insertion of the auxiliary data block from the second layer at the interruption position, wherein when the auxiliary data is selected for insertion at the interruption position, the auxiliary data block from the second layer is inserted at the interruption position, and thereafter reading of the data block in the first layer continues from the interruption position, and when the continuing of the reading of the data block in the first layer is selected, reading of the data block in the first layer continues without insertion of the auxiliary data from the second layer.

6. The two-layer optical disk of claim 1, wherein said first layer and said second layer comprise films of dissimilar materials.

7. The two-layer optical disk of claim 1, wherein said first layer is a film of aluminum, and said second layer is a film of gold.

8. The two-layer optical disk of claim 2, wherein said first layer and said second layer comprise films of dissimilar materials.

9. The two-layer optical disk of claim 2, wherein said first layer is a film of aluminum, and said second layer is a film of gold.

10. The two-layer optical disk of claim 3, wherein said first layer and said second layer comprise films of dissimilar materials.

11. The two-layer optical disk of claim 3, wherein said first layer is a film of aluminum, and said second layer is a film of gold.

12. The two-layer optical disk of claim 4, wherein said first layer and said second layer comprise films of dissimilar materials.

13. The two-layer optical disk of claim 4, wherein said first layer is a film of aluminum, and said second layer is a film of gold.

14. The method of claim 5, wherein the first layer and the second layer are produced from dissimilar films.

15. The method of claim 5, wherein the first layer is produced from a film of aluminum, and the second layer is produced from a film of gold.

\* \* \* \* \*